US008013554B2

(12) United States Patent
West et al.

(10) Patent No.: US 8,013,554 B2
(45) Date of Patent: Sep. 6, 2011

(54) SHUTDOWN PATH PERFORMANCE TEST FOR PERMANENT MAGNET AC MOTOR IN HYBRID POWERTRAIN

(75) Inventors: Stephen T. West, New Palestine, IN (US); Wei D. Wang, Troy, MI (US)

(73) Assignee: GM Global Technology Operations LLC

( * ) Notice: Subject to any disclaimer, the term of this patent is extended or adjusted under 35 U.S.C. 154(b) by 445 days.

(21) Appl. No.: 12/240,378

(22) Filed: Sep. 29, 2008

(65) Prior Publication Data

US 2009/0121668 A1     May 14, 2009

Related U.S. Application Data

(60) Provisional application No. 60/986,414, filed on Nov. 8, 2007.

(51) Int. Cl.
*H02P 7/00* (2006.01)

(52) U.S. Cl. ... 318/432; 318/434; 318/700; 318/400.01; 318/599; 318/721; 702/57; 702/58; 702/59

(58) Field of Classification Search ............. 318/400.02, 318/400.33, 432, 434, 433, 700, 720, 721, 318/716, 599, 603, 400.01, 799; 701/22, 701/29, 31, 33, 34, 35; 702/65, 64; 180/65.21, 180/65.265, 65, 275, 65.285, 65.8; 363/21.01, 363/63

See application file for complete search history.

(56) References Cited

U.S. PATENT DOCUMENTS

| | | | | |
|---|---|---|---|---|
| 5,345,155 A * | 9/1994 | Masaki et al. | ............ | 318/400.07 |
| 5,453,930 A * | 9/1995 | Imaseki et al. | .................. | 701/22 |
| 5,457,364 A * | 10/1995 | Bilotti et al. | .................. | 318/434 |
| 5,739,664 A * | 4/1998 | Deng et al. | ..................... | 318/808 |
| 5,977,740 A * | 11/1999 | McCann | ....................... | 318/701 |
| 6,750,626 B2 * | 6/2004 | Leonardi et al. | ............... | 318/602 |
| 6,914,408 B2 * | 7/2005 | Sawada et al. | .................. | 318/727 |
| 6,984,954 B2 * | 1/2006 | Leonardi et al. | ............... | 318/602 |
| 7,071,642 B2 * | 7/2006 | Wilton et al. | ................. | 318/268 |
| 7,259,530 B2 * | 8/2007 | Ochiai et al. | .................. | 318/105 |
| 7,545,111 B2 * | 6/2009 | Fu et al. | .................... | 318/400.23 |

* cited by examiner

*Primary Examiner* — Rita Leykin

(57) ABSTRACT

A diagnostic system for a hybrid vehicle comprises a motor control module and a fault diagnostic module. The motor control module controls torque output of an electric motor having a predetermined number of phases. The fault diagnostic module determines a position of a rotor of the electric motor, aligns the rotor with a phase angle of one of the phases, selectively diagnoses a fault based on a current of at least one of the phases, and selectively disables the electric motor based on the diagnosis.

16 Claims, 4 Drawing Sheets

SHUTDOWN PATH PERFORMANCE TEST FOR PERMANENT MAGNET AC MOTOR IN HYBRID POWERTRAIN

CROSS-REFERENCE TO RELATED APPLICATIONS

This application claims the benefit of U.S. Provisional Application No. 60/986,414, filed on Nov. 8, 2007. The disclosure of the above application is incorporated herein by reference in its entirety.

FIELD

The present disclosure relates to hybrid vehicles, and more particularly to shutdown path diagnostics for a motor of a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, an exemplary electric hybrid vehicle 10 is shown. The electric hybrid vehicle 10 includes an engine assembly 12, a hybrid power assembly 14, a transmission 16, a drive axle 18, and a control module 20. The engine assembly 12 includes an internal combustion engine 22 that is in communication with an intake system 24, a fuel system 26, and an ignition system 28.

The intake system 24 includes an intake manifold 30, a throttle 32, and an electronic throttle control (ETC) 34. The ETC 34 controls the throttle 32 to control airflow into the engine 22. The fuel system 26 includes fuel injectors (not shown) to control a fuel flow into the engine 22. The ignition system 28 ignites an air/fuel mixture provided to the engine 22 by the intake system 24 and the fuel system 26.

The engine 22 is coupled to the transmission 16 via a coupling device 44. The coupling device 44 may include one or more clutches and/or a torque converter. The engine 22 generates torque to drive the transmission 16 and propel the electric hybrid vehicle 10. The transmission 16 transfers power from the engine 22 to an output shaft 46, which rotatably drives the drive axle 18.

The hybrid power assembly 14 includes one or more motor generator units. For example only, as shown in FIG. 1, the hybrid power assembly 14 includes two motor generator units: a first motor generator unit (MGU) 38 and a second MGU 40. The hybrid power assembly 14 also includes a power control device 41 and a rechargeable battery 42.

The first and second MGUs 38 and 40 operate independently and at any given time may each operate as either a motor or a generator. An MGU operating as a motor supplies power (e.g., torque), all or a portion of which may be used to drive the output shaft 46. An MGU operating as a generator converts mechanical power into electrical power.

For example only, the first MGU 38 may generate electrical power based on the output of the engine 22, and the second MGU 40 may generate electrical power based on the output shaft 46. Electrical power generated by one of the MGUs 38 and 40 may be used, for example, to power the other of the MGUs 38 and 40, to recharge the battery 42, and/or to power electrical components. While the MGUs 38 and 40 are shown as being located within the transmission 16, the MGUs 38 and 40 may be located in any suitable location.

The control module 20 is in communication with the fuel system 26, the ignition system 28, the ETC 34, the MGUs 38 and 40, the power control device 41, and the battery 42. The control module 20 is also in communication with an engine speed sensor 48 that measures an engine speed. For example, the engine speed may be based on the rotation of the crankshaft. The engine speed sensor 48 may be located within the engine 22 or at any suitable location, such as near the crankshaft.

The control module 20 controls operation of the engine 22 and the MGUs 38 and 40. The control module 20 also selectively controls recharging of the battery 42. The control module 20 controls recharging of the battery 42 and the operation of the MGUs 38 and 40 via the power control device 41. The power control device 41 controls power flow between the battery 42 and the MGUs 38 and 40. For example only, the power control device 41 may be an inverter and/or an IGBT (insulated gate bipolar transistor).

The control module 20 may include multiple processors for controlling respective operations of the electric hybrid vehicle 10. For example, the control module 20 may include a first processor for determining desired torque for the engine 22 and the MGUs 38 and 40 and a second processor for controlling torque of each of the MGUs 38 and 40.

SUMMARY

A diagnostic system for a hybrid vehicle comprises a motor control module and a fault diagnostic module. The motor control module controls torque output of an electric motor having a predetermined number of phases. The fault diagnostic module determines a position of a rotor of the electric motor, aligns the rotor with a phase angle of one of the phases, selectively diagnoses a fault based on a current of at least one of the phases, and selectively disables the electric motor based on the diagnosis.

In further features, the fault diagnostic module determines a positive phase angle and a negative phase angle for each of the phases and aligns the rotor with one of the positive and negative phase angles of one of the phases.

In still further features, the fault diagnostic module determines a nearest phase angle based on the position of the rotor and the positive and negative phase angles and aligns the rotor with the nearest phase angle.

In other features, the fault diagnostic module aligns the rotor with the phase angle by commanding application of an aligning current to the electric motor based on the position of the rotor and the phase angle.

In further features, the fault diagnostic module determines when the rotor is aligned with the phase angle based on a comparison of a measured current through one of the phases and a respective current threshold for the one of the phases.

In other features, the current is a normalized current determined for one of the phases.

In further features, the fault diagnostic module determines the normalized current based on a first current of the one of the phases measured when the rotor is aligned with the phase angle and a second current of the one of the phases measured over a period after the rotor is aligned with the phase angle.

In still further features, the fault diagnostic module diagnoses the fault when the normalized current is greater than a first current threshold.

In other features, the fault diagnostic module diagnoses the fault when the normalized current is at least one of less than a second current threshold and greater than a third current threshold, wherein the third current threshold is greater than the second current threshold.

In further features, the fault diagnostic module disables operation of the electric motor when the fault is diagnosed.

A method for a hybrid vehicle comprises: controlling torque output of an electric motor having a predetermined number of phases; determining a position of a rotor of the electric motor; aligning the rotor with a phase angle of one of the phases; selectively diagnosing a fault based on a current of at least one of the phases; and selectively disabling the electric motor based on the diagnosis.

In further features, the method further comprises determining a positive phase angle and a negative phase angle for each of the phases of the electric motor, wherein the aligning the rotor comprises aligning the rotor with one of the positive and negative phase angles of one of the phases.

In still further features, the method further comprises determining a nearest phase angle based on the position of the rotor and the positive and negative phase angles, wherein the aligning the rotor comprises aligning the rotor with the nearest phase angle.

In other features, the aligning the rotor with the phase angle comprises commanding application of an aligning current to the electric motor based on the position of the rotor and the phase angle.

In further features, the method further comprises determining when the rotor is aligned with the phase angle based on a comparison of a measured current through one of the phases and a respective current threshold for the one of the phases.

In other features, the current is a normalized current determined for one of the phases.

In further features, the method further comprises determining the normalized current based on a first current of the one of the phases measured when the rotor is aligned with the phase angle and a second current of the one of the phases measured over a period after the rotor is aligned with the phase angle.

In still further features, the selectively diagnosing the fault comprises diagnosing the fault when the normalized current is greater than a first current threshold.

In other features, the selectively diagnosing the fault comprises diagnosing the fault when the normalized current is at least one of less than a second current threshold and greater than a third current threshold, wherein the third current threshold is greater than the second current threshold.

In still other features, the selectively disabling comprises disabling operation of the electric motor when the fault is diagnosed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
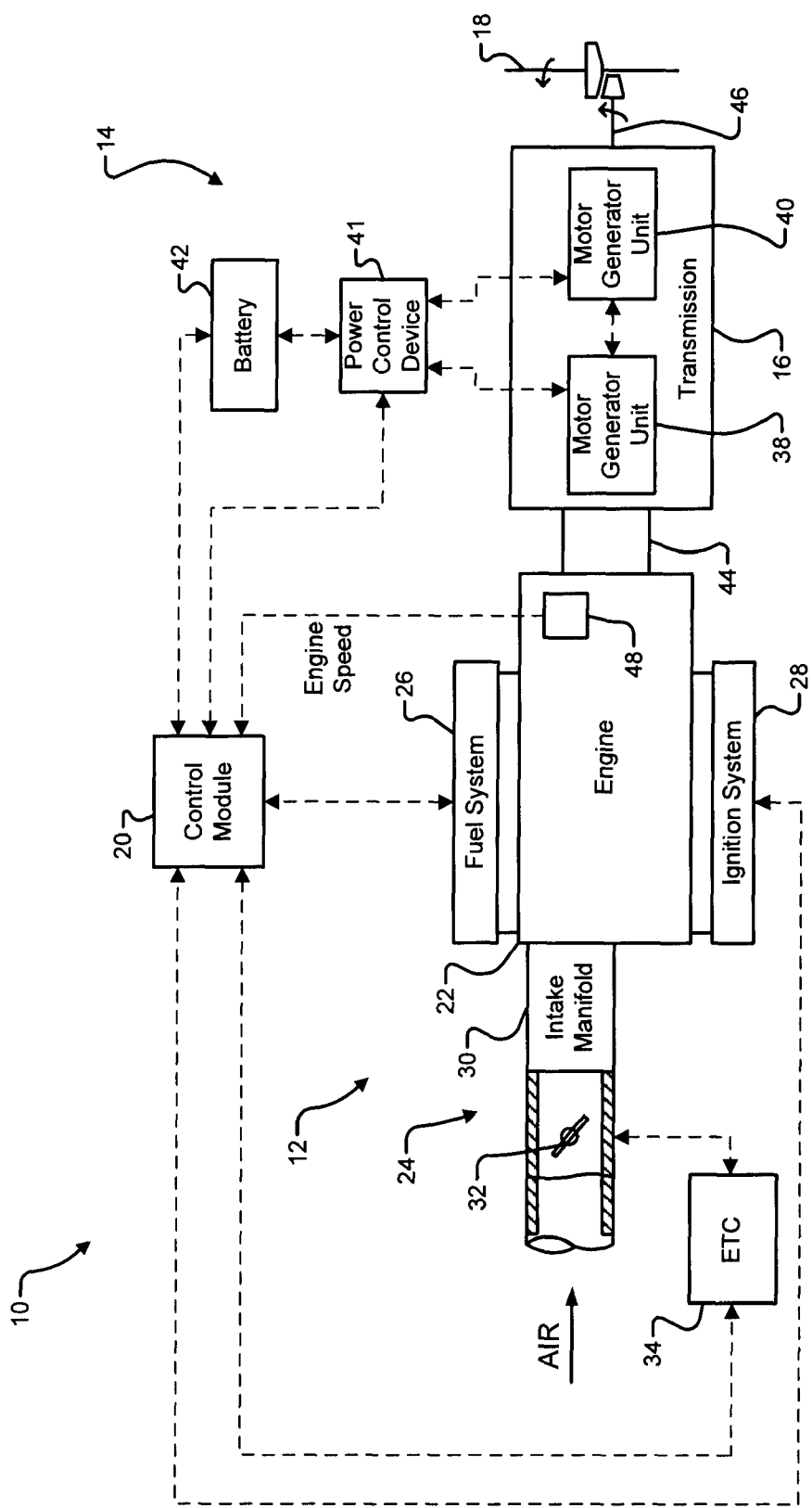
FIG. 1 is a functional block diagram of an exemplary electric hybrid vehicle control system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
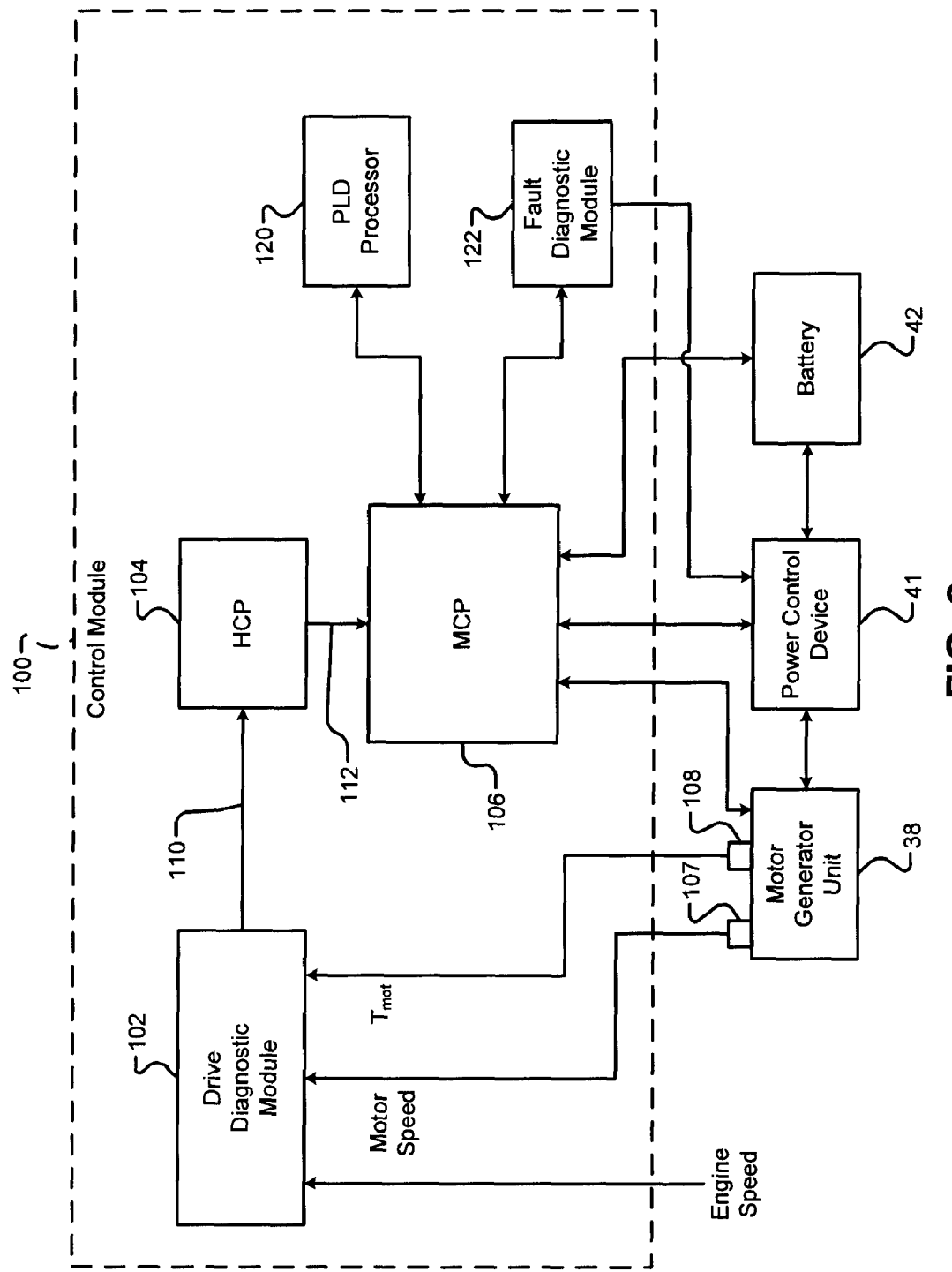
FIG. 2 is a functional block diagram of an exemplary control module that includes a hybrid control processor and a motor control processor according to the present disclosure.

Referring now to FIG. 2, a functional block diagram of an exemplary control module 100 of an electric hybrid vehicle according to the present disclosure is presented. The control module 100 includes a drive diagnostic module 102, a hybrid control processor (HCP) 104, and a motor control processor (MCP) 106. The drive diagnostic module 102 receives various inputs including, but not limited to, engine speed, motor speed, and motor torque.

For example, the drive diagnostic module 102 receives the engine speed from the engine speed sensor 48. The drive diagnostic module 102 also receives a motor speed measured by a motor speed sensor 107 and a motor torque ($T_{mot}$) measured by a motor torque sensor 108. The motor speed sensor 107 and the motor torque sensor 108 measure the speed and torque of the MGU 38, respectively. As the electric hybrid vehicle 10 includes more than one MGU, the drive diagnostic module 102 may receive the motor speed and torque of more than one MGU. For example, the drive diagnostic module 102 may also receive the motor speed and torque of the second MGU 40.

The drive diagnostic module 102 generates various signals 110 based on the engine speed, the motor speed, and the motor torque. The HCP 104 receives the signals 110 from the drive diagnostic module 102. The HCP 104 determines a requested motor torque 112 for an MGU based on the received signals 110. While the HCP 104 is shown as determining the requested motor torque 112 for the MGU 38, the HCP 104 may determine a requested motor torque for each of the MGUs 38 and 40.

The MCP 106 receives the requested motor torque 112 from the HCP 104 and controls the torque of the first MGU 38 based on the requested motor torque 112. For example, the MCP 106 may cause power to be supplied to the MGU 38 in an amount that allows the MGU 38 to produce the requested motor torque 112. In other words, the MCP 106 controls the torque of the MGU 38 based on the requested motor torque 112. As such, it is desirable to ensure that the torque commanded by the MCP 106 accurately corresponds to the requested motor torque 112.

The control module 100 may include multiple layers of security/diagnostics to ensure accuracy and consistency between the HCP 104 and the MCP 106. For example, one layer of diagnostics may relate to diagnostics of basic components and subsystems such as voltage and current sensors, temperature sensors, and resolver performance diagnostics. Another layer of diagnostics may relate to an independent calculation of achieved motor torque. This independent calculation of the achieved motor torque may be implemented using separate memory locations for software, calibration variables, and static variables. Values used in the calculation may be verified (e.g., using checksum verification) between different execution loops.

Yet another layer of diagnostics may be implemented to prevent software execution and/or processor faults of the MCP 106. For example only, the control module 100 may include a processor such as a Programming Logic Device (PLD) processor 120. While the PLD processor 120 is shown as being located external to the MCP 106, the PLD processor 120 may be located in any suitable location.

The PLD processor 120 may send a seed value to the MCP 106. The MCP 106 determines a return key value based on the seed value and transmits the return key to the PLD processor 120. The PLD processor 120 determines the functionality of the MCP 106 based on the return key (e.g. by comparing the return key to an expected key). When the return key does not match the expected key, the PLD processor 120 may implement remedial actions. For example, the PLD processor 120 may reset the MCP 106 and put the first MGU 38 into a secure shutdown mode.

When a fault is detected, the PLD processor 120 and/or the MCP 106 may initiate a secure shutdown mode for the MGU 38. A procedure for putting the MGU 38 into the secure shutdown mode may follow one or more shutdown paths. A shutdown path may include a particular sequence of measurements and calculations involving the MGU 38. While the principles of the present application will be discussed as they relate to the MGU 38, the principles of the present application are also applicable to the second MGU 40 and/or any other MGU.

The control module 100 may perform one or more shutdown path tests to determine whether the secure shutdown mode is functioning properly. For example, the control module 100 may initiate the shutdown path tests at vehicle startup (e.g., at ignition). The shutdown path tests may ensure that the MCP 106 and/or the PLD processor 120 can properly shut down the first MGU 38 when one or more components (e.g., sensors) malfunction and/or when the control module 100 requests a vehicle shutdown. In various implementations, the control module 100 includes a fault diagnostic module 122 that performs the shutdown path tests.

Shutdown path tests according to the present disclosure may include, but are not limited to, a Three Phase Short test and a Three Phase Open test. At vehicle startup, the capability of the MCP 106 to conduct one or more of these shutdown tests is verified. Inability to verify the shutdown tests may indicate defects in, for example, the first MGU 38, power stage, and/or the MCP 106.

The fault diagnostic module 122 may initiate remedial action if it is unable to verify the proper performance of the shutdown tests. For example only, the fault diagnostic module 122 may set a fault code, illuminate an accessory light within the hybrid vehicle, and/or disable operation of the MGU 38. The fault diagnostic module 122 may disable operation of one of the MGU 38 via the power control device 41, by disabling the MGU 38 directly, and/or in any other suitable manner.

Figure 3:
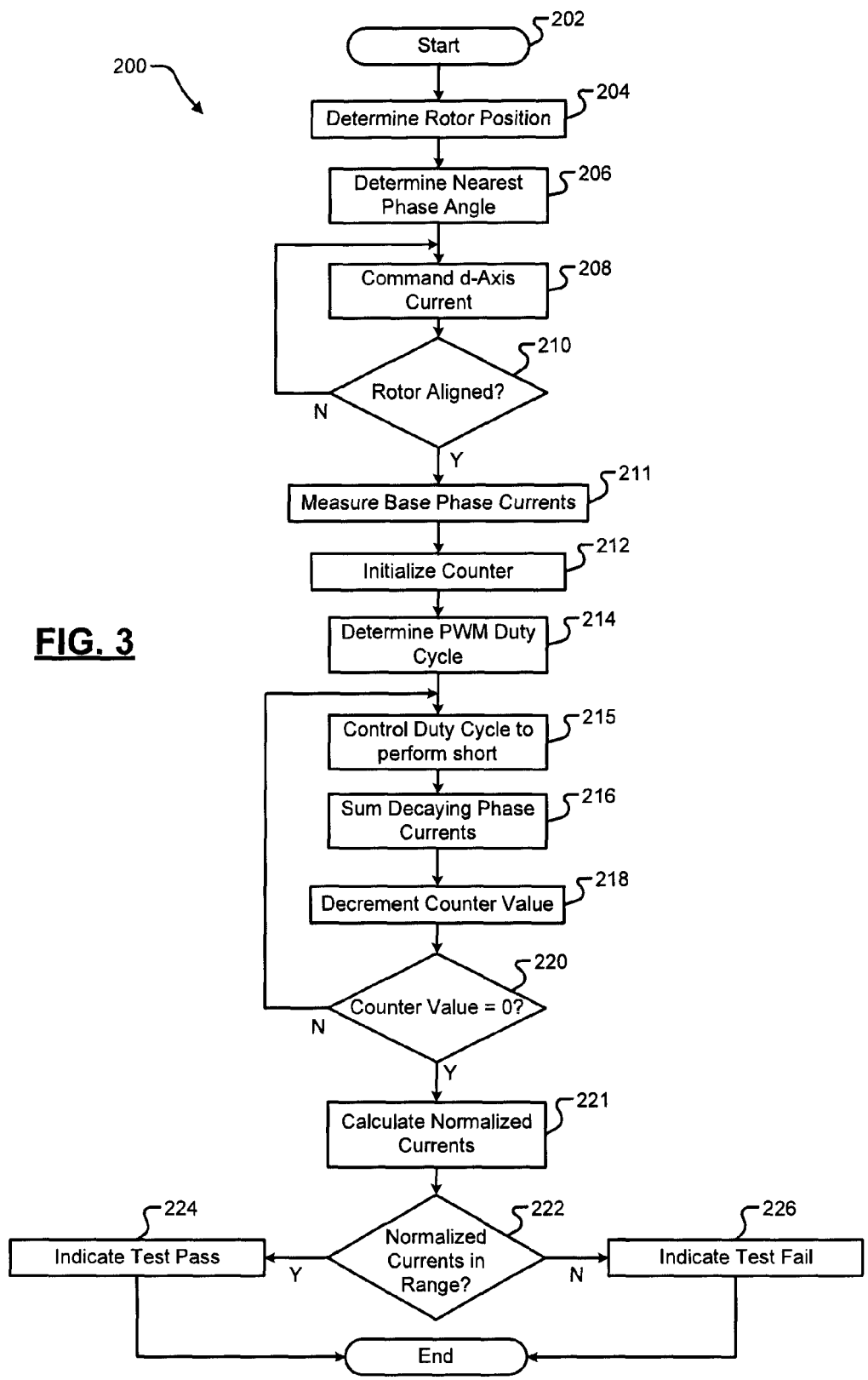
FIG. 3 is an exemplary flow diagram illustrating steps of a method for verifying a first shutdown test according to the present disclosure.

Referring now to FIG. 3, a method 200 of verifying the Three Phase Short test begins in step 202. The method 200 determines a rotor position of a rotor within the first MGU 38 in step 204. For example only, the rotor position may be determined using a resolver or a rotary encoder. In step 206, the method 200 determines a nearest phase angle to the rotor position.

The first MGU 38 may be operated in a predetermined number of phases, such as three phases (e.g., phases A, B, and C). Each of the phases includes a positive portion (+) and a negative portion (−). For example, for the three phases, the phase angles may be A+, A−, B+, B−, C+, and C−. The nearest phase angle determined in step 206 may be determined based on one of these phase angles. The method 200 commands a d-axis current (i.e., an aligning current) based on the determined phase angle in step 208. In other words, in step 208 the method 200 commands a current sufficient to align the rotor with the nearest phase angle.

The method 200 determines whether the rotor is properly aligned with the nearest phase angle in step 210. If true, the method 200 continues to step 211. If false, the method 200 returns to step 208 and continues to control the current until the rotor is properly aligned with one of the phase angles.

The method 200 may determine whether the rotor is properly aligned with the nearest phase angle, for example, based on a comparison of currents through each of the phases with a respective threshold. For example only, a first threshold corresponding to the phase with which the rotor is aligned may be set based on the aligning current. A second threshold corresponding to the other two phases (i.e., the phases with which the rotor is not aligned) may be set based on half of the first threshold. In other words, the second threshold may be set based on half of the aligning current. In various implementations, the first and second thresholds may be set based on a predetermined amount or percentage less than the aligning current and half of the aligning current, respectively. The method 200 may determine that the rotor is properly aligned when the phase currents are greater than their respective thresholds.

In step 211, the method 200 measures of the phase currents for each of the phases. The method 200 may also record the phase currents. These phase currents will be referred to as the base phase currents. The method 200 initializes a counter with a value set for the Three Phase Short test in step 212. For example only, the counter value may be set based on a period of time calibrated based on characteristics of the MGU 38. The counter value is used to determine the number of iterations of the test. The method 200 determines a PWM duty cycle for the test in step 214. For example, the PWM duty cycle may be determined to create a short circuit condition of all three phases.

In step 215, the method 200 controls the duty cycle to create the shorted condition in all of the phases. For example only, the method 200 may control the power control device 41 according to the PWM duty cycle. The method 200 sums the respective phase currents in step 216. The method 200 decrements the counter value in step 218. In step 220, the method 200 determines whether the counter value is zero. If true, the method 200 continues to step 221. If false, the method 200 repeats steps 215 through 220 and repeats summing the respective phase currents.

In step 221, the method 200 calculates respective normalized phase currents for each of the phases. For example only, the method 200 may calculate the normalized phase currents using the equation:

$$NC_N = \frac{SC_N}{BC_N},$$

where $NC_N$ is the normalized current of the Nth phase, $SC_N$ is the summed phase current of the Nth phase as determined after the final iteration of step 216, and $BC_N$ is the base current of the Nth phase as determined in step 211 multiplied by the initial counter value. The method 200 determines whether the respective normalized currents are within a calibrated range in step 222. If true, the method 200 indicates that the test passed in step 224. If false, the method indicates that the test failed in step 226. In other implementations, the method 200 may determine that the test has failed when one or more of the respective normalized currents is greater than or less than a respective calibrated value.

The method 200 may also enable or disable operation of the MGU 38 after steps 224 or 226 are performed, respectively. The method 200 then ends. Alternatively, the method 200 may return to step 202 if the test has failed. For example, the method 200 may allow a predetermined period of time after the test has failed in order to pass the test.

Figure 4:
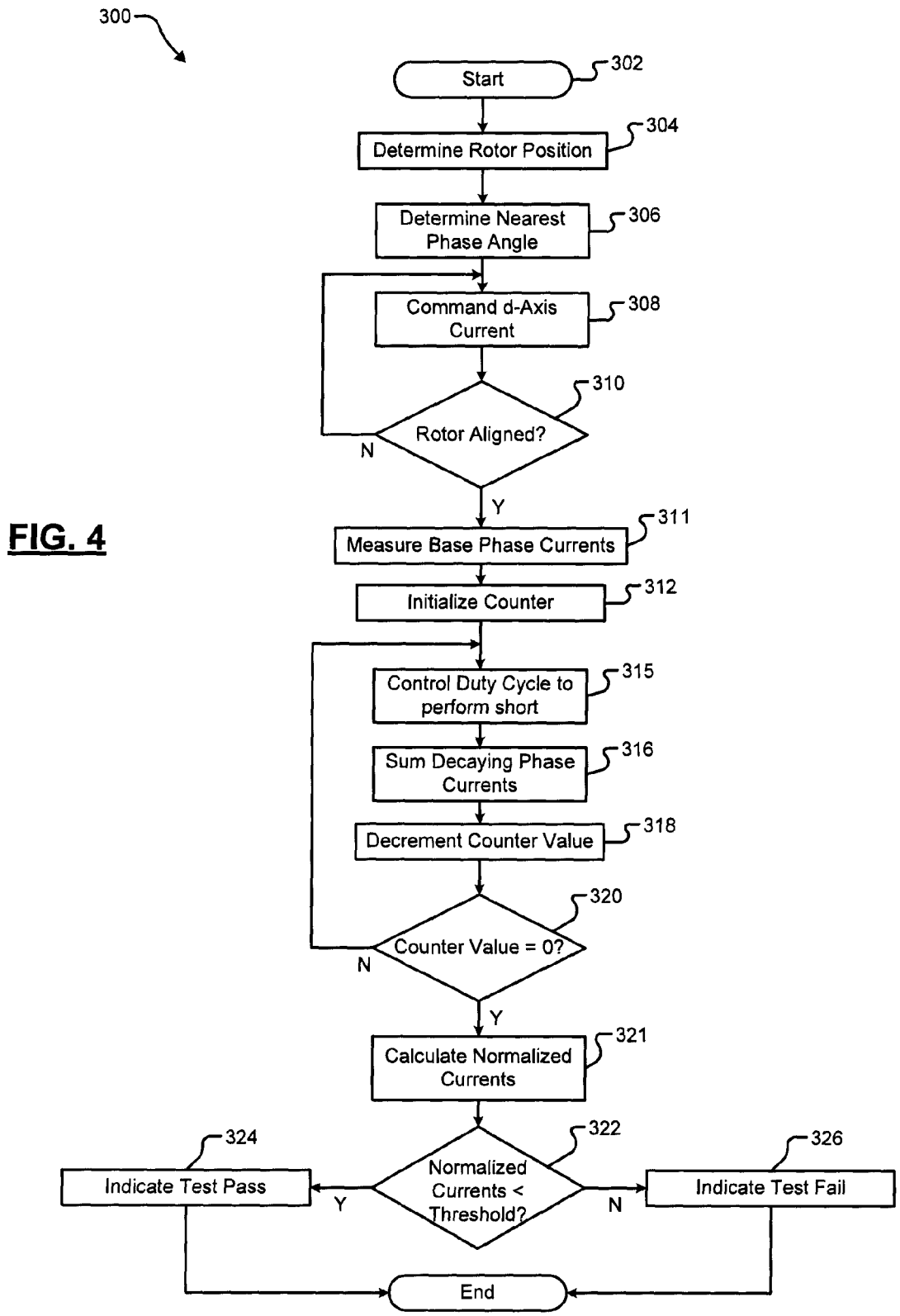
FIG. 4 is an exemplary flow diagram illustrating steps of a method for verifying a second shutdown test according to the present disclosure.

Referring now to FIG. 4, a method 300 of verifying the Three Phase Open test begins in step 302. The method 300 determines a rotor position of a rotor within the MGU 38 in step 304. For example only, the method 300 may determine the rotor position using a resolver or a rotary encoder. In step 306, the method 300 determines a nearest phase angle to the rotor position.

The MGU 38 may be operated in a predetermined number of phases, such as three phases (e.g., phases A, B, and C). Each of the phases includes a positive portion (+) and an negative portion (−). For example, for the three phases, the phase angles may be A+, A−, B+, B−, C+, and C−. The nearest phase angle determined in step 306 may be determined based on one of these phase angles. In step 308, the method 300 commands a d-axis current (i.e., an aligning current) based on the nearest phase angle. In other words, in step 308 the method 300 commands a current sufficient to align the rotor of the MGU 38 the nearest phase angle.

The method 300 determines whether the rotor is properly aligned with the nearest phase angle in step 310. If true, the method 300 continues to step 311. If false, the method 300 returns to step 308 and continues to control the current until the rotor is properly aligned with one of the phase angles.

The method 300 may determine whether the rotor is properly aligned based on, for example, a comparison of currents through each of the phases with a respective threshold. For example only, a first threshold corresponding to the phase with which the rotor is aligned may be set based on the aligning current. A second threshold corresponding to the other two phases (i.e., the phases with which the rotor is not aligned) may be set based on half of the first threshold. In other words, the second threshold may be set based on half of the aligning current. In various implementations, the first and second thresholds may be set based on a predetermined amount or percentage less than the aligning current and half of the aligning current, respectively. The method 300 may determine that the rotor is properly aligned when the phase currents are greater than their respective thresholds.

In step 311, the method 300 measures of the phase currents of each of the phases. The method 300 may also record the phase currents. These phase currents will be referred to as the base phase currents. The method 300 initializes a counter with a value for the Three Phase Open test in step 312. For example only, the counter value may be based on a period of time calibrated based on characteristics of the MGU 38. The counter value is used to determine the number of iterations of the test.

In step 315, the method 300 controls the duty cycle to create an open circuited condition in all of the phases. For example only, the method 300 may control the power control device 41 according to the PWM duty cycle. The method 300 sums the respective phase currents in step 316. The method 300 decrements the counter value in step 318. In step 320, the method 300 determines whether the counter value is zero. If true, the method 300 continues to step 321. If false, the method 300 repeats steps 315 through 320 and repeats summing the respective phase currents.

In step 321, the method 300 calculates respective normalized phase currents for each of the phases. For example only, the method 300 may calculate the normalized phase currents using the equation:

$$NC_N = \frac{SC_N}{BC_N},$$

where $NC_N$ is the normalized current of the Nth phase, $SC_N$ is the summed phase current of the Nth phase as determined after the final iteration of step 316, and $BC_N$ is the base current of the Nth phase as determined in step 311 multiplied by the initial counter value. The method 300 determines whether the respective normalized currents are each less than a threshold in step 322. If true, the method 300 indicates that the test passed in step 324. If false, the method indicates that the test failed in step 326.

The method 300 may also enable or disable operation of the MGU 38 after steps 324 or 326 are performed, respectively. The method 300 then ends. Alternatively, the method 300 may return to step 302 if the test has failed. For example, the method 300 may allow a predetermined period of time after the test has failed in order to pass the test.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a hybrid vehicle, comprising:
a motor control module that controls torque output of an electric motor having a predetermined number of phases; and
a fault diagnostic module that determines a position of a rotor of said electric motor, that aligns said rotor with a phase angle of one of said phases, that selectively diagnoses a fault based on a normalized current of at least one of said phases, that determines said normalized current based on a first current of said one of said phases measured when said rotor is aligned with said phase angle and a second current of said one of said phases measured over a period after said rotor is aligned with said phase angle, and that selectively disables said electric motor based on said diagnosis.

2. The diagnostic system of claim 1 wherein said fault diagnostic module determines a positive phase angle and a negative phase angle for each of said phases and aligns said rotor with one of said positive and negative phase angles of one of said phases.

3. The diagnostic system of claim 2 wherein said fault diagnostic module determines a nearest phase angle based on said position of said rotor and said positive and negative phase angles and aligns said rotor with said nearest phase angle.

4. The diagnostic system of claim 1 wherein said fault diagnostic module aligns said rotor with said phase angle by commanding application of an aligning current to said electric motor based on said position of said rotor and said phase angle.

5. The diagnostic system of claim 4 wherein said fault diagnostic module determines when said rotor is aligned with said phase angle based on a comparison of a measured current through one of said phases and a respective current threshold for said one of said phases.

6. The diagnostic system of claim 1 wherein said fault diagnostic module diagnoses said fault when said normalized current is greater than a first current threshold.

7. The diagnostic system of claim 1 wherein said fault diagnostic module diagnoses said fault when said normalized current is at least one of less than a second current threshold and greater than a third current threshold, wherein said third current threshold is greater than said second current threshold.

8. The diagnostic system of claim 1 wherein said fault diagnostic module disables operation of said electric motor when said fault is diagnosed.

9. A method for a hybrid vehicle, comprising:
controlling torque output of an electric motor having a predetermined number of phases;
determining a position of a rotor of said electric motor;
aligning said rotor with a phase angle of one of said phases;
selectively diagnosing a fault based on a normalized current of at least one of said phases;
determining said normalized current based on a first current of said one of said phases measured when said rotor is aligned with said phase angle and a second current of said one of said phases measured over a period after said rotor is aligned with said phase angle; and
selectively disabling said electric motor based on said diagnosis.

10. The method of claim 9 further comprising determining a positive phase angle and a negative phase angle for each of said phases of said electric motor, wherein said aligning said rotor comprises aligning said rotor with one of said positive and negative phase angles of one of said phases.

11. The method of claim 10 further comprising determining a nearest phase angle based on said position of said rotor and said positive and negative phase angles, wherein said aligning said rotor comprises aligning said rotor with said nearest phase angle.

12. The method of claim 9 wherein said aligning said rotor with said phase angle comprises commanding application of an aligning current to said electric motor based on said position of said rotor and said phase angle.

13. The method of claim 12 further comprising determining when said rotor is aligned with said phase angle based on a comparison of a measured current through one of said phases and a respective current threshold for said one of said phases.

14. The method of claim 9 wherein said selectively diagnosing said fault comprises diagnosing said fault when said normalized current is greater than a first current threshold.

15. The method of claim 9 wherein said selectively diagnosing said fault comprises diagnosing said fault when said normalized current is at least one of less than a second current threshold and greater than a third current threshold, wherein said third current threshold is greater than said second current threshold.

16. The method of claim 9 wherein said selectively disabling comprises disabling operation of said electric motor when said fault is diagnosed.

* * * * *